No. 3,080,377
PREPARATION OF 2-PYRROLIDONE FROM SUC-
CINIC ANHYDRIDE, AMMONIA AND HYDRO-
GEN IN THE PRESENCE OF RANEY COBALT
Hsiang P. Liao, Baltimore, Md., assignor to FMC Cor-
poration, New York, N.Y., a corporation of Delaware
No Drawing. Filed July 17, 1961, Ser. No. 124,356
2 Claims. (Cl. 260—326.5)

This application relates to the preparation of 2-pyrrol-
idone. More particularly, it relates to a one-step synthesis
of 2-pyrrolidone from succinic anhydride in the liquid
phase.

2-pyrrolidone is commercially prepared at the pesent
time by a four-step process. This process involves the
reaction of acetylene with formaldehyde to produce 2-
butyne-1,4-diol, which is reduced to 1,4-butanediol. This
product is then catalytically dehydrogenated to γ-butyro-
lactone, which is converted to 2-pyrrolidone by reaction
with ammonia.

It has also been proposed that 2-pyrrolidone may be
prepared from succinic acid by reaction with ammonia
and hydrogen in the vapor phase in the presence of a
catalyst containing a hydrogenating constituent such as
nickel, cobalt or copper and a dehydrating constituent
such as phosphoric acid or boric acid. However, this
process has the disadvantages of giving poor yields and
requiring long reaction times.

It is an object of this invention to provide an economical
process for the preparation of 2-pyrrolidone from succinic
anhydride using a one-step procedure.

It has now been discovered that 2-pyrrolidone can be
prepared from succinic anhydride in good yield and short
reaction time in a single reaction step which comprises
reacting one mole of succinic anhydride, at least two
moles of hydrogen and at least one mole of ammonia in
the liquid phase in the presence of a catalytic amount of
a hydrogenating metal selected from the group consist-
ing of cobalt, nickel, ruthenium, and palladium at a tem-
perature of 200–350° C. and a pressure of 500–5000
p.s.i.g. Surprisingly, when operating in the liquid phase
and in the presence of the catalysts disclosed herein,
succinic anhydride is converted to 2-pyrrolidone in good
yield.

Succinic anhydride is a readily available commercial
product which is prepared by a variety of known proce-
dures, such as the hydrogenation of maleic anhydride in
the presence of a hydrogenation catalyst.

The reductive ammonolysis of succinic anhydride is
suitably carried out in the liquid phase by reacting suc-
cinic anhydride, ammonia, and hydrogen in the presence
of a hydrogenating catalyst in accordance with the equa-
tion:

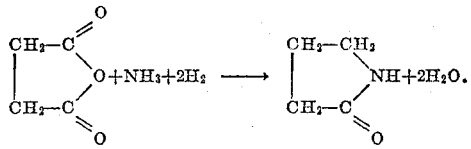

The reaction is carried out by charging an autoclave con-
taining succinic anhydride and the catalyst with a meas-
ured quantity of ammonia, preferably liquid ammonia
under pressure. The vessel is then pressurized with hy-
drogen and heated to the reaction temperature. It is
preferable to maintain the reaction medium in an agitated
condition.

The reaction is suitably carried out at temperatures in
the range of about 200–350° C. For best results, tem-
peratures of 225–280° C. should be employed. The pres-
sure of the reaction should be maintained in the range of
about 500–5000 p.s.i.g. and preferably from 1000–4000
p.s.i.g. The reaction time may be varied from about 1–8
hours. Under the preferred operating conditions the re-
action is completed in 2–6 hours.

The reaction vessel should be charged with at least
the stoichiometric amount of hydrogen and ammonia;
that is, at least two moles of hydrogen and at least one
mole of ammonia for each mole of succinic anhydride. In
practice, the actual amount of hydrogen present is gen-
erally determined by the amount necessary to maintain
the desired pressure. The ammonia is generally present
in an amount of about 1–20 moles per mole of anhydride,
and preferably about 2–5 moles.

The hydrogenating metals which have been found to be
suitable for catalyzing the novel reaction taught herein
are cobalt, nickel, ruthenium and palladium. The catalyst
should be present in an amount sufficient to catalyze the
reaction at a reasonable rate, for example, at least about
2%. Preferably the catalytic material is present in an
amount of about 5–10% by weight based on the succinic
anhydride. In the case of ruthenium and palladium, the
metal should be supported on a carrier such as carbon.
Raney cobalt and Raney nickel are the preferred forms
of these metals. The preparation of Raney metals is well
known and is described, for example, by Schroter in
Newer Methods of Preparative Organic Chemistry, Inter-
science Publishers, Inc. (1948), pages 65–67. Cobalt
and nickel which have been stabilized by oxidation to the
non-pyrophoric form, as disclosed by Signaigo in Patent
No. 2,166,183, may also be used.

The following examples, illustrating the novel method
disclosed herein for preparing 2-pyrrolidone, are presented
without any intention that the invention be limited there-
to. All percentages are by weight.

*Example 1*

A 250 cubic centimeter magnetically agitated stainless
steel autoclave was charged with 130 grams of succinic
anhydride, 12 grams of Raney cobalt and 40 grams of
liquefied ammonia, and then pressurized with hydrogen.
The contents of the reaction vessel were agitated and
heated to a temperature in the range of 250–280° C. for
6 hours. The pressure was maintained at 4000 p.s.i.g.
throughout this period. After cooling, the autoclave was
vented, and the crude product was removed and filtered
to separate the catalyst. The filtrate was first distilled
at atmospheric pressure, and then under reduced pressure
to give 76 grams (69% of theory) of pyrrolidone. The
product was analyzed by vapor phase chromatography
and found to be 98% pure.

*Example 2*

A stirred autoclave was charged with 200 grams of suc-
cinic anhydride, 17 grams of Raney cobalt and 140 grams
of liquefied ammonia and then pressurized with hydrogen.
The contents of the reaction vessel were stirred and heated
to a temperature in the range of 245–255° C. for 5.5
hours. The pressure was maintained at 4000 p.s.i.g.
throughout this period. After cooling, the autoclave was
vented and the crude product was filtered. The filtrate
was first distilled at atmospheric pressure, and then under
reduced pressure to give 112 grams (66% of theory) of
pyrrolidone.

*Example 3*

A stirred autoclave was charged with 100 grams of suc-
cinic anhydride, 9.3 grams of Raney cobalt and 43 grams
of liquefied ammonia, and then pressurized with hydrogen.
The reaction mixture was heated at temperatures in the
range of 250–260° C. for 6 hours while stirring and
maintaining the pressure at 1850 p.s.i.g. After cooling,
the autoclave was vented and the crude product was
filtered. The filtrate was distilled at atmospheric pressure, and then under reduced pressure to give 52 grams (61% of theory) of pyrrolidone.

*Example 4*

A stirred autoclave was charged with 600 grams of succinic anhydride, 267 grams of liquefied ammonia and 70 grams of wet 5% palladium-on-carbon (50% moisture) as catalyst, and then pressurized with hydrogen. The contents of the autoclave were heated to a temperature in the range of 240–260° C. with stirring for 3 hours at a pressure of 1750 p.s.i.g. After cooling, the autoclave was vented and the crude product was filtered. The filtrate was distilled at atmospheric pressure, and then under reduced pressure. The yield of pyrrolidone was 33% of theory.

*Example 5*

A stirred autoclave was charged with 600 grams of succinic anhydride, 100 grams of Raney cobalt, 264 grams of liquefied ammonia and 152 grams of water, and then pressurized with hydrogen. The contents of the reaction vessel were heated to a temperature in the range of 238–258° C. with stirring for 2 hours while maintaining the pressure of 1300-1600 p.s.i.g. After cooling, the autoclave was vented and the crude product was filtered. The filtrate was distilled at atmospheric pressure, and then under reduced pressure to give 309 grams (61% of theory) of pyrrolidone.

*Example 6*

A stirred autoclave was charged with 130 grams of succinic anhydride, 11 grams of Raney cobalt and 44 grams of liquid ammonia, and heated at 224–279° C. for 1 hour. The autoclave was then pressurized with hydrogen and the temperature of the reaction mixture was maintained at about 250° C. with continuous stirring for 4 hours while maintaining the pressure at 3600 p.s.i.g. After cooling and venting the autoclave, the crude product was filtered. The filtrate was distilled at atmospheric pressure, and then under reduced pressure to give 65 grams (59% of theory) of pyrrolidone.

*Example 7*

A stirred autoclave was charged with 600 of succinic anhydride, 105 grams of wet sponge nickel and 250 grams of liquefied ammonia, and then pressurized with hydrogen. The contents of the autoclave were agitated and heated to a temperature in the range of 195–265° C. for 3 hours. The pressure was maintained at 1300-1700 p.s.i.g. throughout this period. After cooling, the autoclave was vented and the crude product was filtered. The filtrate was first distilled at atmospheric pressure, and then under reduced pressure. The yield of pyrrolidone was 30% of theory.

*Example 8*

A stirred autoclave was charged with 200 grams of succinic anhydride, 25 grams of Raney cobalt, and 54 grams of a liquid ammonia, and then pressurized with hydrogen. The reaction mixture was heated at temperatures in the range of 245-265° C. with stirring for 2 hours while maintaining the pressure at 4000 p.s.i.g. After cooling, the autoclave was vented and the crude product was filtered. The filtrate was distilled at atmospheric pressure, and then under reduced pressure to give 97 grams (57% of theory) of pyrrolidone.

*Example 9*

A 500 milliliter stirred autoclave was charged with 100 grams of succinic anhydride, 4 grams of 5% ruthenium-on-carbon, 25 grams of ammonia and 100 grams of tetrahydrofuran, and then pressurized with hydrogen. The reaction mixture was heated to a temperature of 200° C. for 3 hours, while maintaining the pressure at 2500 p.s.i.g. After being cooled, the autoclave was vented and the crude product was filtered. The filtrate was distilled at atmospheric pressure, and then under reduced pressure. The yield of pyrrolidone was 50% of theory.

As will be apparent to those skilled in the art, numerous modifications and variations of the reaction conditions may be made without departing from the spirit of the invention or the scope of the following claims.

I claim:

1. An improved method of preparing 2-pyrrolidone in good yield which comprises reacting one mole of succinic anhydride, at least two moles of hydrogen and at least one mole of ammonia in the liquid phase in the presence of a catalytic amount of Raney cobalt at a temperature of 200–350° C. and a pressure of 500–5000 p.s.i.g.

2. An improved method of preparing 2-pyrrolidone in good yield which comprises reacting one mole of succinic anhydride, at least two moles of hydrogen and at least one mole of ammonia in the liquid phase and in the presence of a catalytic amount of Raney cobalt at a temperature of 230–280° C. and a pressure of 1000–4000 p.s.i.g.

References Cited in the file of this patent

UNITED STATES PATENTS

| | | |
|---|---|---|
| 2,187,745 | Lazier | Jan. 13, 1940 |
| 2,351,939 | Drossbach et al. | June 20, 1944 |